UNITED STATES PATENT OFFICE.

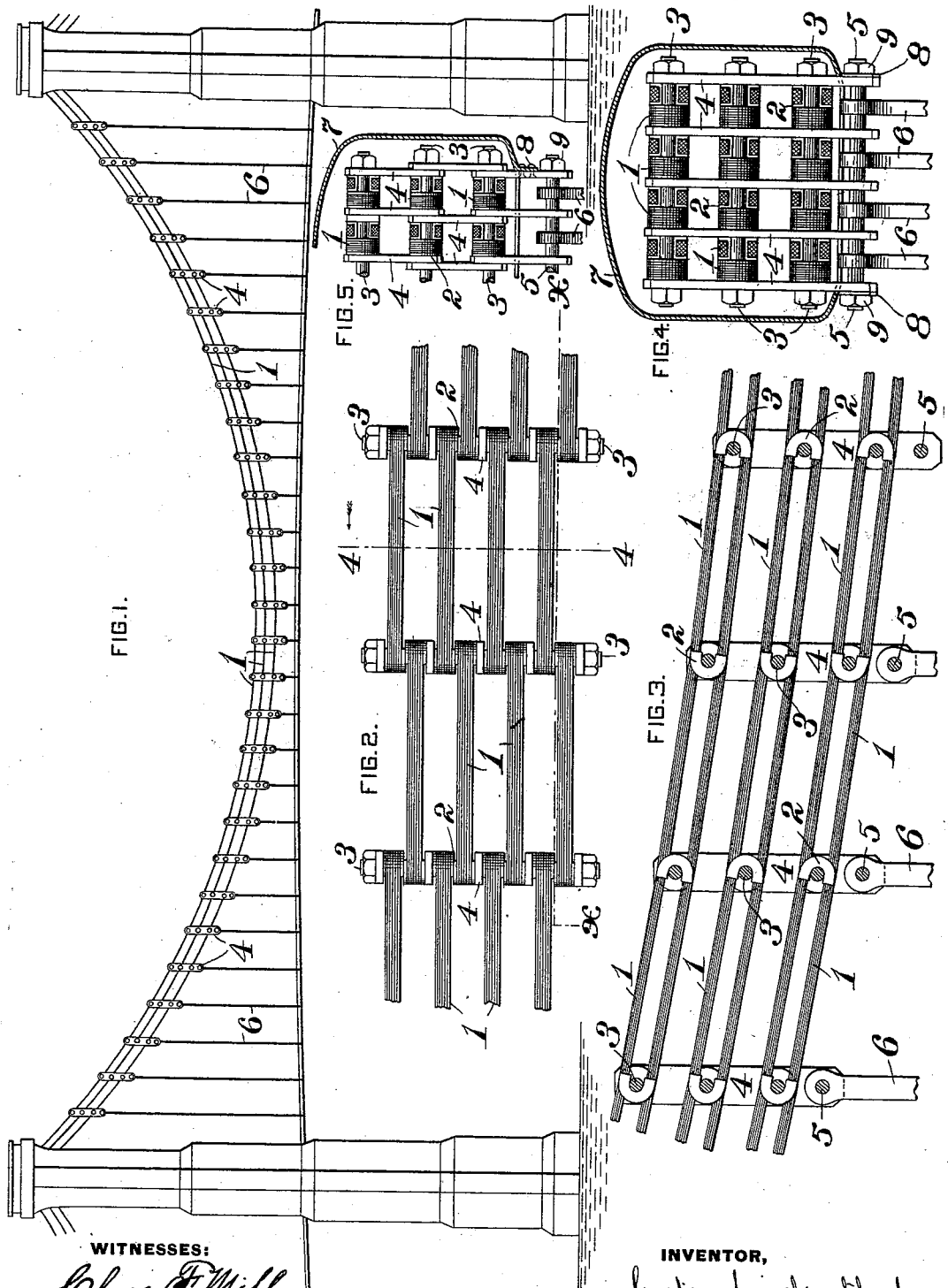

GUSTAV LINDENTHAL, OF NEW YORK, N. Y.

CABLE FOR BRIDGES.

SPECIFICATION forming part of Letters Patent No. 542,829, dated July 16, 1895.

Application filed January 21, 1895. Serial No. 535,663. (No model.)

*To all whom it may concern:*

Be it known that I, GUSTAV LINDENTHAL, a citizen of the United States, residing at New York, in the county of New York and State of New York, have invented or discovered certain new and useful Improvements in Cables for Bridges, &c., of which improvements the following is a specification.

The invention described herein relates to certain improvements in the construction of suspension-bridges.

In Letters Patent No. 500,267, dated June 27, 1893, I have described and claimed a cable for suspension-bridges, &c., composed of a series of wire links connected longitudinally by suitable pins. It is sometimes desirable to form the cables for bridges of a series of two or more chains composed of such links and arranged one above the other in layers or strands.

The object of the present invention is to provide for the connection of the layers or strands on chains vertically with each other, and with the suspension-rods supporting the platform of the bridge in such manner that each chain will bear its proper proportion of the load.

In general terms the invention consists in the construction and combination substantially as hereinafter more fully described and claimed.

In the accompanying drawings, forming a part of this specification, Figure 1 is a view in side elevation of a portion of a suspension-bridge having my improvement applied thereto. Fig. 2 is a top plan view of a portion of one of the strands or layers. Fig. 3 is a longitudinal section. Fig. 4 is a transverse vertical section, the planes of section of Figs. 3 and 4 being indicated by the lines *x x* and 4 4, respectively, of Fig. 2; and Fig. 5 is a similar view of a portion of a cable illustrating certain modifications.

In the practice of my invention the cable is formed of a series of two or more chains 1, forming strands or layers of the cable and each consisting of links formed by wire coiled around shoes 2 and connected by bolts 3 passing through the shoes, as described and claimed in Letters Patent hereinbefore referred to. As shown in Fig. 1, each panel of the chains consists of a series of three or more links arranged side by side on the same bolts which connect them with the links of the next adjacent division or panel, the links of one division or section alternating on the bolts with those of the adjacent divisions or panels.

The links of each chain in any one panel or division of the cable are made of the same length, so that the chains shall be equal in length, and the chains of the cable are so hung on the supporting-towers that the bolts 3 at the ends of each division or panel will be in the same vertical plane. The several chains forming the cable are connected together by metal plates 4, fitting onto the bolts 3. These coupling-plates may be in one piece, each containing three or more pin-holes for three or more chains, or said coupling-plates may reach only from one pin to the other, each plate in such case containing only two pin-holes and overlapping the similar plates above or below, in the case of three or more chains composing one cable. The holes in the plates for the reception of bolts are so arranged that the chains or strands forming the cable are held parallel with each other. The lower ends of the plates are provided with holes for the reception of bolts 5, on which are hung the suspenders 6, for supporting the platform of the bridge.

By reason of the equal length of the chains and of the arrangement of the connecting-bolts at the ends of the panel in the same vertical plane, and having the same vertical distance of pin-holes in the connecting metal plates, the load upon the suspenders will be equally distributed among the chains composing the cable, independent of the form of the cable curve and unaffected by the distortion of the cable under moving or uneven loads.

The cable is protected by a casing 7, provided with holes or slots, through which project the lower ends of the vertical protecting-plates. At the ends of the slots the casing is provided with ears or lugs 8, having holes for the passage of the ends of the bolts 5, on which the ears are held by nuts 9, as shown in Fig. 4; or, if desired, the casing may be held in place by bolting or riveting the ears or lugs 8 to the outside connecting-plates 4, as shown in Fig. 5.

I claim herein as my invention—

1. A cable having in combination, a series of two or more chains forming strands or layers of equal length, each consisting of a series of wire links connected by bolts, the bolts at the ends of each panel being in the same vertical plane, and metal plates connecting the bolts in the several chains and holding the latter parallel, or approximately parallel, with each other, substantially as set forth.

2. A cable having in combination a series of two or more chains forming strands or layers, of equal length, each consisting of a series of wire links connected by bolts, the bolts at the ends of each panel being in the same vertical plane, metal plates connecting the bolts in the several chains, and holding the chains parallel, or approximately parallel, with each other, and suspenders connected to said plates, substantially as set forth.

3. The combination of a cable and a metal casing surrounding the cable and supported by the metal plates connecting the suspenders to the cable, substantially as set forth.

In testimony whereof I have hereunto set my hand.

GUSTAV LINDENTHAL.

Witnesses:
OTIS H. CUTLER,
M. B. SANFORD.